United States Patent Office 3,388,185
Patented June 11, 1968

3,388,185
SOLID EPOXIDE COATING COMPOSITIONS CONTAINING A MIXTURE OF MONO AND POLYFUNCTIONAL ANHYDRIDES
Newton N. Goldberg and Irving N. Elbling, Pittsburgh, Pa., assignors to Westinghouse Electric Corporation, East Pittsburgh, Pa., a corporation of Pennsylvania
No Drawing. Filed Feb. 20, 1964, Ser. No. 346,080
9 Claims. (Cl. 260—830)

ABSTRACT OF THE DISCLOSURE

Coating compositions, suitable for use in a fluidized bed process, are formed from progenitors which have not been prereacted. The compositions cure rapidly to form hard, infusible, very flexible coatings. the compositions contain a major portion of at least one polyglycidyl ether of a dihydric phenol and minor portions of a mixture of anhydride curing agents which contribute to the flexibility of the cured coating. At least a portion of the anhydride curing agents are polyfunctional compounds.

---

The present invention relates to coating compositions and has particular reference to homogeneous pulverulent coating compositions adapted for use in fluidized powder coating processes. The invention relates particularly to the preparation of a coating composition characterized by outstanding flexibility subsequent to curing.

The fluidized bed method of coating articles essentially is a dipping process wherein the article to be coated is dipped or otherwise introduced into a fluidized mass of solid resin particles. The resin particles are set in fluid motion by an upward flow of a gas such as air. When fluidized, the mass of resin particles has the appearance of a boiling liquid and assumes penetrating flow characteristics similar to a liquid. The article to be coated is preheated to a temperature above the melting point of the resin and then immersed into the fluidized mass of resin powder particles. Alternatively, the powdered resin may be applied to the heated article by spray application, sprinkling, or the like method. When the resin particles contact the preheated article, the particles melt and adhere to the preheated article surface. Thermosetting resin powders require an afterbake subsequent to removal of the article from the fluidized mass of resin powder. The afterbake period varies depending on the particular thermosetting characteristics of the resin employed and the article being coated.

The fluidized powder process of coating articles provides coatings which are substantially thicker than can be obtained by conventional brush, spray or roller coating with paint. Thus, utilizing the fluidized coating method, relatively thick coatings of from 0.005 to 0.062 inch may be applied to a substrate in one application.

Resins known as epoxy resins (glycidyl ethers) have received wide acceptance in the art for use in the fluidized process of coating. The epoxy resins themselves are permanently thermoplastic and require the addition of cross-linking agents or other reactive materials in order that they may be cured to hard, infusible resinous products. However, desirable as they may be, the cured epoxy coatings have one serious disadvantage in that they are inherently brittle. This lack of flexibility has restricted their use to coatings applied essentially to rigid substrates.

It is a primary object of this invention to provide resinous epoxy fluidizing powders characterized by greatly improved flexibility subsequent to curing.

Another object of the invention resides in the provision of a completely curved epoxy fluidized coating which, when applied to a substrate, will allow contraction and expansion of the substrate without stress to the coating.

Still another object of the invention resides in the provision of relatively heavy epoxy resin coatings which may be bent or distorted without stress or damage to the cured fluidized coating.

Other objects of the invention will become apparent from the following detailed description thereof.

It has been discovered that epoxy resin coating compositions having these desirable characteristics are obtainable and may be produced by blending the particular resin or resins with an anhydride curing agent wherein at least a portion of the anhydride is polyfunctional in composition. There are critical limitations which apply both to the resinous material and to the curing agent and these limitations will be set forth in detail hereinafter.

The preferred epoxy resins employed in the invention are complex polymeric reaction products of polyhydric phenols with polyfunctional halohydrins and/or glycerol dichlorohydrin. The products contain terminal epoxy groups and the epoxy equivalency of the resins is a value between 1.0 and 2.0. Typical epoxy resins have been disclosed in U.S. Patent Nos. 2,585,115 and 2,589,245 to Greenlee. The resins are readily available in commercial quantities.

Typical polyhydric phenols used in the preparation of these epoxy resins include resorcinol and various bisphenols resulting from the condensation of phenol with aldehydes and ketones such as formaldehyde, acetaldehyde, acetone, methyl ethyl ketone, and the like. A typical resin is the reaction product of epichlorohydrin and 2,2-bis-(p-hydroxyphenyl) propane.

The epoxy resins may also be characterized by reference to their epoxy equivalent which is the mean molecular weight of the particular resin divided by the mean number of epoxy radicals per molecule, or in any case the number of grams of epoxy resin equivalent to one mole of the epoxy group or one gram equivalent of epoxide. In the present invention, the suitable epoxy resins are characterized by an epoxy equivalency (epoxy equivalent weight) of from about 450 to about 4000. Within this range there is a preferred range of epoxy equivalency of from about 1500 to about 4000. Moreover, where a mixture of epoxy resins is to be employed, it has been found that at least about 75% by weight of the total epoxy resin content should be comprised of a resin having an epoxy equivalency of about 1550 to about 2000. Within these limitations, the epoxy resins may be used singly or in admixture with other members within the group.

The anhydrides which are to be used in carrying out the invention include the conventional mono- and polyfunctional anhydrides. Typical of the mono-functional anhydrides are tetrahydrophthalic anhydride (THPA), phthalic anhydride, nadic anhydride, and the like. Polyfunctional anhydrides which may be employed include pyromellitic dianhydride (PMDA), polyazelaic polyanhydride (PAPA), the reaction product of trimellitic anhydride and a glycol (TMX), and benzophenone tetracarboxylic acid dianhydride (BTDA). The anhydrides may be used singly or in admixture with the provision that the anhydride composition must contain at least a portion of polyfunctional composition. The total anhydride content of the epoxy-anhydride mixture must lie within the range of from about 0.5 to about 1.5 anhydride equivalents for each epoxy equivalent. It is highly desirable that the polyfunctional portion of the anhydride composition constitute at least 25% of the anhydride equivalents. A preferred range of anhydride equivalent to epoxy equivalent is from about 0.85 to about 1.15.

In preparing the pulverulent coating compositions the epoxy resin or resins and anhydride constituents may be blended in any desired manner. For example, the powdered materials may be mechanically mixed in a hammer mill, ball mill, or other suitable mixing equipment. On the other hand, the epoxy resin may be melted and the anhydride blended therein on, for example, a multi-roll hot mill. It is also to be understood that the resin components may, where desired, include relatively small amounts of pigments, dyes, and the like. The amounts of extenders and dyes present must be small enough that the physical properties of the cured coating compositions are not impaired.

The invention will be further illustrated by the following examples. It is to be understood, however, that the examples are given for the purpose of illustration only.

In the examples, the following abbreviations will be employed:

E.E. Wt.=Epoxy equivalent weight
E.E.=Epoxy equivalents
A.E. Wt.=Anhydride equivalent weight
A.E.=Anhydride equivalents
A.E./E.E.=Anhydride equivalents per epoxy equivalent.

Example I

An epoxy resin fluidized powder was formulated as follows:

Epoxy Resin—800 parts E.E. Wt. 1550–2000 (0.456 E.E.)
(THPA)—52.0 parts A.E. Wt. 152.14 (0.342 A.E.) 1.5 A.E./EE
(PMDA)—34.7 parts A.E. Wt. 109.06 (0.342 A.E.) 1.5 A.E./EE
Silica Gel—6.0 parts All of the ingredients were ground in a hammer mill twice through a ⅛″ screen. An additional 6.8–8 parts of silica gel was added to the powder and the entire mixture blended in a Patterson-Kelly Twin Shell blender from four to eight minutes. The powder so obtained fluidized well maintaining a constant bed height throughout fluidization. Coatings applied to copper bars (6″ x ⅜″ x ⅛″) pre-heated to 200° C. were found to touch cure in two minutes at 200° C. (post bake) and to be completely infusible after 0.5 hour at 200° C. A flat-to-edge coverage ratio of 2.3 to 1 was obtained. The coatings were smooth, pin-hole free, and very flexible as evidenced by the bending of the coated copper bars 180° around a ¾ inch diameter mandrel without cracking or breaking the coating.

Fluidized powders prepared as described have all particles completely and uniformly distributed with no apparent settling out of any one particular species. A sieve analysis of this powder was found to be:

| Particles on screen mesh | Percent |
| --- | --- |
| 35 | 0.2 |
| 40 | 0.1 |
| 60 | 5.7 |
| 80 | 15.2 |
| 100 | 17.5 |
| 140 | 28.3 |
| 200 | 10.7 |
| 230 | 9.8 |
| 270 | 4.3 |
| 325 | 4.5 |
| Pan | 3.1 |
| Total | 99.4 |

Example II

Epoxy Resin—640 parts E.E. Wt. 1550–2000 (0.366 EE)
Epoxy Resin—160 parts E.E. Wt. 2400–4000 (0.05 EE)
THPA—47.5 parts A.E. Wt. 152.14 (0.312 AE) 1.5 AE/EE
PMDA—34.0 parts A.E. Wt. 109.06 (0.312 AE) 1.5 AE/EE
Silica Gel—6.0 parts plus 6.0 parts This powder was prepared as in Example I. Coatings applied to copper bars pre-heated to 200° C. were found to touch cure in 1.5 minutes, give a flat-to-edge coverage ratio of 2.15 to 1, and to be so flexible (after a 0.5 hour post cure) as to bend greater than 90° with no impairment whatsoever.

Example III

Epoxy Resin—720 parts E.E. Wt. 1550–2000 (0.412 E.E.)
Epoxy Resin—80 parts E.E. Wt. 2400–4000 (0.025 E.E.)
THPA—74.9 parts 0.492 A.E. 1.5 AE/EE
PMDA—17.9 parts 0.164 A.E. 1.5 AE/EE
$TiO_2$—16.0 parts
Cobalt Blue—6.0 parts
Silica Gel—6.0 parts plus 9.2 parts Prepared as in Example I, this powder fluidized extremely well and when applied to copper bars pre-heated to 200° C. gave coatings which touch cured in three minutes at 200° C. (post bake), had a flat-to-edge coverage ratio of 2.13 to 1, and were flexible (copper bars could be bent more than 90° without breaking or cracking when post cured 0.5 hour at 200° C.). Replacement of the blue pigment (cobalt blue) with a red pigment (Venetian red) produces a comparable cured resin.

Example IV

Epoxy Resin—800 parts E.E. Wt. 1550–2000 (0.456 E.E.)
PMDA—37.4 parts A.E. Wt. 109.06 (0.342 A.E.) 1.5 AE/EE
PAPA—28.6 parts A.E. Wt. 83.5 (0.342 A.E.) 1.5 AE/EE
Silica Gel—6.0 parts Prepared as in Example I, this powder fluidized well, touch cured in 1.5 minutes at 200° C. and provided a flexible coating.

Example V

In this formulation, the anhydride used is the reaction product of trimellitic anhydride and glycerol reacted in a molar ratio of three to one, respectively. There are, theoretically, three anhydride groups per molecule.

Epoxy Resin—720 parts E.E. Wt. 1550–2000 (0.412 E.E.)
Epoxy Resin—80 parts E.E. Wt. 2400–4000 (0.025 E.E.)
TMX-330 [1]—81.7 parts A.E. Wt.-220 (0.372 A.E.) 0.85 AE/EE
Silica Gel—6.0 parts plus 9.2 parts

[1] Manufactured by Amoco Chemicals Corporation.

Prepared as in Example I, this powder fluidized well, touch cured in two minutes at 200° C., had a flat-to-edge coverage ratio of 1.9 to 1 and can be termed moderately flexible. Coated and cured copper bars could be bent between 45° and 90° before cracks appeared in the coating.

Example VI

In this formulation, the anhydride used is the reaction product of trimellitic anhydride and ethylene glycol reacted in a molar ratio of 2 to 1, respectively. There are theoretically, two anhydride groups per molecule.

Epoxy Resin—720 parts E.E. Wt. and E.E. Values
Epoxy Resin—80 parts as in Ex. V
TMX-220 [1]—69.2 parts A.E. Wt. 210 (0.328 A.E.) 0.75AE/EE
Silica Gel—6.0 parts plus 11.2 parts

[1] Manufactured by Amoco Chemicals Corporation.

Prepared as in Example I, this powder fluidized well, touch cured in two minutes at 200° C., and had a flat-to-edge coverage ratio of 2 to 1. Coated and cured (0.5 hour at 200° C.) copper bars could be bent almost 180° before cracks appeared in the coating.

Example VII

Epoxy Resin—400 parts E.E. Wt. 1550–2000 (0.228 E.E.)
BTDA—55.1 parts A.E. Wt. 161.1 (0.342 A.E.) 1.5AE/EE
Silica Gel—3.0 parts The intimately mixed powder fluidized well and was found to be touch cured in 2.5 minutes at 200° C. Coated and cured copper bars could be bent greater than 90° without any impairment to the coating.

Example VIII

This formulation makes use of benzophenone tetracarboxylic acid dianhydride (BTDA), in conjunction with tetrahydrophthalic anhydride.

Epoxy Resin—720 parts–E.E. Wt. and E.E. values as in Ex. V.
Epoxy Resin—80 parts
THPA—74.9 parts A.E. Wt. 152.1 (0.492 E.E.) 1.5AE/EE
BTDA—26.4 parts A.E. Wt. 161.1 (0.164 E.E.) 1.5AE/EE
Silica Gel—6.0 parts plus 9.2 parts The intimately mixed powder fluidized well, touch cured in 3.5 minutes at 200° C., and had a flat-to-edge coverage ratio of 2.13 to 1. Coated and cured copper bars could be bent greater than 90° without any impairment to the coating.

Example IX

This formulation illustrates the use of a ternary mixture of anhydrides.

Epoxy Resin—400 parts E.E. Wt. 1550–2000 (0.228 E.E.)
THPA—26.0 parts A.E. Wt. 152.14 (0.171 A.E.)
PMDA—14.9 parts A.E. Wt. 109.06 (0.137 A.E.) 1.5AE/EE
TMA—6.6 parts A.E. Wt. 192.12 (0.034 A.E.) 1.5AE/EE
Silica Gel—3.0 parts This intimately mixed powder fluidized well and was touch cured in slightly less than two minutes at 200° C. Coated and cured copper bars could be bent greater than 90° without any damage to the coating.

Example X

This formulation has been produced in three different color variations; orange, blue and brown.

Epoxy Resin—720 parts E.E. Wt. and E.E. (0.412 E.E.)
Epoxy Resin—80 parts values as in Ex. V. (0.025 E.E.)
TMX-220—60 parts A.E. Wt. 210 (0.286 A.E.) 0.865AE/EE
THPA—14 parts A.E. Wt.–152.14 (0.092 A.E.) 0.865AE/EE
Silica Gel—6 parts plus 9.6 parts
TlO$_2$—16 parts This intimately mixed powder fluidized very well, touch cured in less than two minutes at 200° C. and had a flat-to-edge coverage ratio of 2 to 1. Coated and cured copper bars could be bent greater than 90° without causing any damage to the coating.

Example XI

Epoxy Resin—800 parts E.E. Wt. 2400–4000 (0.25 E.E.)
PMDA—10.25 parts (0.094 A.E.) 1.5AE/EE
THPA—42.74 parts (0.281 A.E.) 1.5AE/EE
Silica Gel—1.6 parts Based on a three to one A.E. ratio of THPA to PMDA.

This intimately mixed powder fluidized very well and touch cured in two minutes at 200° C. Coated and cured copper bars could be bent greater than 90° without causing any damage to the coating.

Example XII

Epoxy Resin—300 parts E.E. Wt. 870–1025 (0.316 E.E.)
Epoxy Resin—500 parts E.E. Wt. 2400–4000 (0.156 E.E.)
Silica Gel—9.0 parts
    Total of 0.472 E.E.
THPA—80.8 parts (0.531 A.E.) 1.5AE/EE
PMDA—19.3 parts (0.177 A.E.) 1.5AE/EE Based on three to one A.E. ratio of THPA to PMDA.

The intimately mixed powder fluidized well and was found to be touch cured in 3.5 minutes at 200° C. Coated and cured copper bars could be bent without any impairment to the coating.

Example XIII

Epoxy Resin—100 parts E.E. Wt. 450–525 (0.204 E.E.)
Epoxy Resin—700 parts E.E. Wt. 2400–4000 (0.218 E.E.)
Silica Gel—15 parts
    Total of 0.422 E.E.
THPA—72.1 parts (0.474 A.E.) 1.5AE/EE
PMDA—17.4 parts (0.159 A.E.) 1.5AE/EE Based on three to one A.E. ratio of THPA to PMDA.

The intimately mixed powder fluidized well and was found to be touch cured in 3.5 minutes at 200° C. Coated and cured copper bars could be bent without any impairment to the coating.

Example XIV

Epoxy Resin—400 parts E.E. Wt. 1550–2000 (0.228 E.E.)
Epoxy Resin—400 parts E.E. Wt. 2400–4000 (0.125 E.E.)
Silica Gel—15 parts
    Total of 0.353 E.E.
THPA—6.7 parts (0.044 A.E.) 0.5AE/EE
PMDA—14.5 parts (0.133 A.E.) 0.5AE/EE Based on three to one A.E. ratio of PMDA to THPA.

The intimately mixed powder fluidized well and was found to be touch cured in 3.5 minutes at 200° C. Coated and cured copper bars could be bent without any impairment to the coating.

Example XV

Epoxy Resin—800 parts (0.457 E.E.)
THPA—48.1 parts (0.316 A.E.) 1.15AE/EE
PMDA—22.9 parts (0.210 A.E.) 1.15AE/EE
Silica Gel—0.8 part plus 3.7 parts
    Total of .526 A.E. made up of 60% THPA and 40% PMDA This material fluidized well, touch cured in 1.5 minutes at 200° C., and gave a flat-to-edge ratio of 2.05 to 1. Copper bars coated with this material could be bent without any impairment to the coating.

It will be noted that in all of the above examples, there is included a small amount of silica gel. This additive acts both as a lubricant and as a thixotropic agent. Its lubricity properties aid in fluidizing the resin-anhydride powder and the amount employed varies with the characteristics of the individual resin powders. However, at least 0.005% by weight based on the epoxy resin is required in order to obtain these benefits. It has also been found that amounts in excess of about 5% do not contribute any more improvement. Other metal oxides may also be employed such as, for example, oxides of sodium, aluminum, calcium, magnesium, iron, antimony, and zinc. When SiO$_2$ is used, it is commonly a commercially available gel composition. In those examples where TiO$_2$ pigment is present, this ingredient aids in enhancing the color tones of the cured resins.

The foregoing description will indicate to those skilled in the art that the present invention provides a novel means of obtaining flexible epoxy resin coatings. The invention is easily practiced and permits the application of relatively thick resin coatings in one operation. It will be evident that the invention represents a decided advance in the fluidized resin powder art.

We claim as our invention:

1. A homogeneous finely divided solid coating composition comprising a major proportion of at least one polyglycidyl ether of a dihydric phenol resin, said resin having an epoxy equivalent weight within the range of about 450 to about 4000, and a minor proportion of anhydride curing agent, the total anhydride content of the composition being within the range of from about 0.5 to about 1.5 anhydride equivalents for each epoxy equivalent, the anhydride curing agent being a mixture of mono- and polyfunctional compounds in which at least 25% of the anhydride equivalents are polyfunctional, wherein the monofunctional compound is selected from the group consisting of tetrahydrophthalic, phthalic and nadic anhydrides and the polyfunctional compound is selected from the group consisting of pyromellitic dianhydride, polyazelaic polyanhydride, benzophenone tetracarboxylic acid dianhydride and the reaction product of trimellitic anhydride with a glycol.

2. The coating composition of claim 1 containing from about 0.005 to about 5%, by weight, based on the weight of resin, of a thixotropic agent.

3. The coating composition of claim 2 wherein the thixotropic agent is an oxide of a metal selected from the group consisting of silicon, sodium, aluminum, calcium, magnesium, iron, antimony and zinc.

4. The coating composition of claim 1 wherein the polyglycidyl ether resin is a mixture of polyglycidyl ethers of dihydric phenols, at least 75% by weight of said mixture having an epoxy equivalent weight within the range of about 1500 to 2000.

5. The coating composition of claim 1 wherein the anhydride equivalent range is from about 0.85 to 1.15 for each epoxy equivalent.

6. The coating composition of claim 4 wherein the anhydride equivalent range is from about 0.85 to 1.15 for each epoxy equivalent.

7. The coating composition of claim 6 wherein the monofunctional anhydride is selected from the group consisting of tetrahydrophthalic, phthalic and nadic anhydrides and the polyfunctional anhydride is pyromellitic dianhydride.

8. The coating composition of claim 1 wherein the polyfunctional anhydride is pyromellitic dianhydride.

9. The coating composition of claim 1 wherein the monofunctional anhydride is tetrahydrophthalic anhydride and the polyfunctional anhydride is pyromellitic dianhydride.

References Cited

UNITED STATES PATENTS

| 3,324,081 | 6/1967 | Barie et al. | 260—47 |
| 3,269,974 | 8/1966 | Childs | 260—831 |
| 3,269,975 | 8/1966 | Lee | 260—47 |
| 3,288,747 | 11/1966 | Sussman | 260—37 |
| 2,695,610 | 12/1960 | Newey | 260—47 |

FOREIGN PATENTS

| 904,397 | 8/1962 | Great Britain. |

MURRAY TILLMAN, *Primary Examiner.*

GEORGE F. LESMEE, *Examiner.*

P. LIEBERMAN, *Assistant Examiner.*